United States Patent
Monson

(10) Patent No.: US 6,887,544 B2
(45) Date of Patent: May 3, 2005

(54) FOUR-SIDED ELASTOMER MOUNT

(75) Inventor: Robert J. Monson, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 137 days.

(21) Appl. No.: 10/261,404

(22) Filed: Sep. 30, 2002

(65) Prior Publication Data

US 2004/0062883 A1 Apr. 1, 2004

(51) Int. Cl.[7] ................................................. B32B 1/08

(52) U.S. Cl. ..................... 428/36.9; 428/34.1; 248/634; 248/562; 248/615

(58) Field of Search .............................. 428/36.9, 34.1; 248/634, 562, 615; 267/140.11, 141

Primary Examiner—Alexander S. Thomas

(57) ABSTRACT

A shock isolator for simultaneously isolating shocks and for supporting a static load in an axial offset compression mode comprising a four-sided elastomer having a first elongated support surface and a second elongated support surface with the laterally offset from each the elastomer rotated at a point between the first support surface and the second support surface to thereby simultaneously provide shock and vibration attenuation while providing axially offset support.

15 Claims, 3 Drawing Sheets

FOUR-SIDED ELASTOMER MOUNT

FIELD OF THE INVENTION

This invention relates to shock isolators and, more specifically, to a shock isolator that can simultaneously provide compressive support without reliance on a direct axial compressive path through the isolator and without significant bias in a single direction.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF T HE INVENTION

Various elastomeric materials have been used, or suggested for use, to provide shock and/or vibration damping as stated in U.S. Pat. No. 5,766,720, which issued on June 16, 1998 to Yamagishi, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones.

The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208, 333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is loaded in the axial compressive mode, where the force between the spaced-apart flat plate is normal to the support surfaces at all points of the surfaces, the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in a shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, generally can not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, may be placed along side or above a housing so that the elastomeric isolators can function in a shear or tension mode while tensionally supporting the static weight of the housing. The positioning in a shear or tension mode can require placing matching elastomeric isolators on each side of the housing. In contrast, the present invention provides an elastomeric isolator that provides compressive support for a housing with a force component that is normal to two spaced-apart support surfaces only around the peripheral of the surfaces. The present invention can be placed beneath a housing to provide static compressive force support for the housing while retaining the necessary dynamic attenuation characteristics to thereby effectively reduce shock and vibration to the housing.

SUMMARY OF THE INVENTION

A shock isolator for simultaneously isolating shocks and supporting a static load comprising an elastomer material having a set of side walls and a set of end walls integrally forming a four-sided shock isolator with a cavity therein. The multiple-sided shock isolator includes a central axis, a first elongated support surface and a second elongated support surface with the first elongated support surface and the second elongated support surface laterally and rotationally positioned with respect to each other so that any point on the first support surface is supported by the second support surface and vice versa to thereby provide shock and vibration attenuation and axially offset support. That is, there is no solid elastomer compressive axis since there is not a line parallel to a central axis that extends from a point on the first elongated support surface to a point on the second elongated support surface without extending out through the sidewalls i.e. there is no solid compressive axis.

DESCRIPTION OF THE PREFERRED EMBODIMENT

Figure 1:
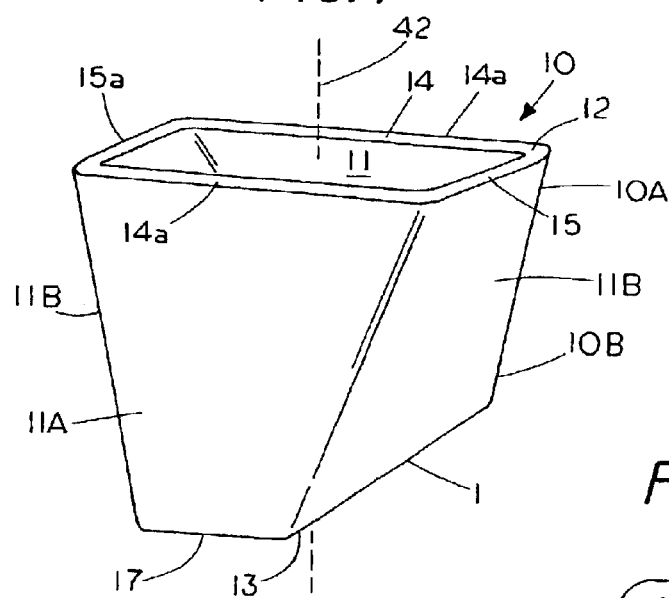
FIG. 1 is a perspective view of a multi-sided shock isolator for providing offset support and shock isolation.

FIG. 1 shows a perspective view of a four-sided shock isolator 10 for simultaneously providing shock and vibration attenuation while providing axially offset support A four-sided shock isolator comprises a shock isolator 10 formed from an elastomer material having a set of sidewalls 11A and a set of end walls 11B integrally connected to form a chamber 11 therein. Located at a first end 10A of four-sided shock isolator 10 is an elongated surface comprising a first elongated-shaped support surface 12 for engaging a first member such as a housing or a cabinet and located at a second end 10B of four-sided shock isolator 10 is an identical elongated surface comprising a second rectangular-shaped support surface 13 for engaging a second member such as a support surface. First support surface 12 comprises parallel side surfaces 14 and 14A and parallel end surfaces 15 and 15A with side surfaces 14 and 14A having a longer length than the end surfaces 15 and 15A. Similarly, second elongated support surface 13 also comprises identical side surfaces and end surfaces with side surface 16 having a longer length than the length of end surface 17. As shown in FIG. 1, the side surfaces 14 and 14A and 16 of the first and second elongated support surfaces 12 and 13 are longer than the end surfaces 15 and 17 of the first and second elongated support surfaces 12 and 13.

A central axis 42 is shown in FIG. 1 extending through the center of chamber 11. The first elongated support surface 12 of shock isolator 10 is laterally positioned with respect to the second elongated support surface 13 so that any point on the first elongated support surface 12 is supported by the second elongated support surface 13 and vice versa so as to permit the shock isolator 10 to simultaneously provide shock and vibration attenuation while providing axially offset support. The lateral positioning of the elongated support surfaces 12 and 13 result in the sidewalls 11A of the shock isolator 10 positioned in a nonparallel relationship with respect to each other and with the end walls 11B of the shock isolator 10 also being positioned in a nonparallel relationship with respect to each other.

Figure 2:
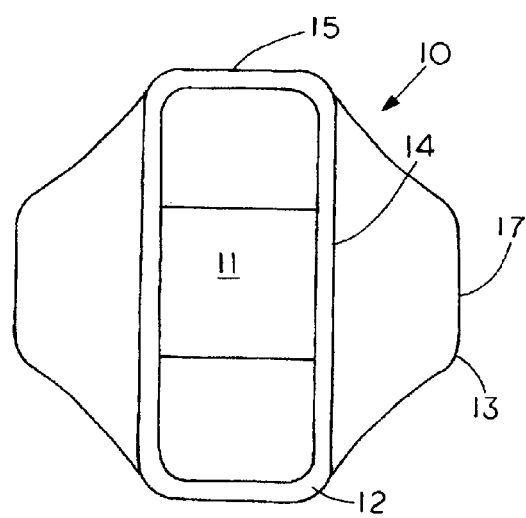
FIG. 2 is a top view of a multi-sided shock isolator for providing offset support and shock isolation.
Figure 3:
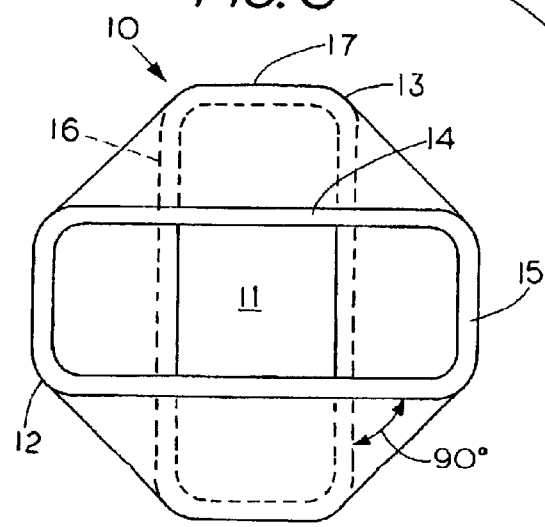
FIG. 3 show the position of the first support surface with respect to the positioning of the second support surface of the four-sided shock isolator of FIG. 1.

FIG. 2 shows a top view of four-sided shock isolator 10 and FIG. 3 shows a top view of four-sided shock isolator 10 with the hidden boundaries of support surface 13 outlined in dashed lines to further illustrate the position of the first support surface 12 with respect to the positioning of the second support surface 13 of the four-sided shock isolator 10. As shown, FIGS. 2 and 3 both illustrate the rotational position of the first elongated-shaped support surface 12 with respect to the second elongated-shaped support 13. Although support surfaces 12 and 13 may be at various rotational positions with respect to each other, FIGS. 2 and 3 show the preferred embodiment where elongated support surface 12 is rotationally positioned 90° with respect to support surface 13.

Figure 4:
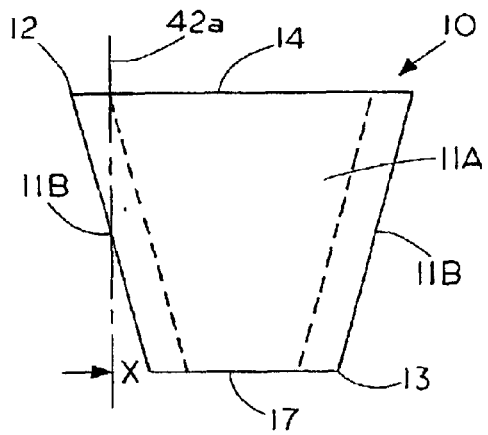
FIG. 4 shows a front view of the four-sided shock isolator of FIG. 1.
Figure 5:
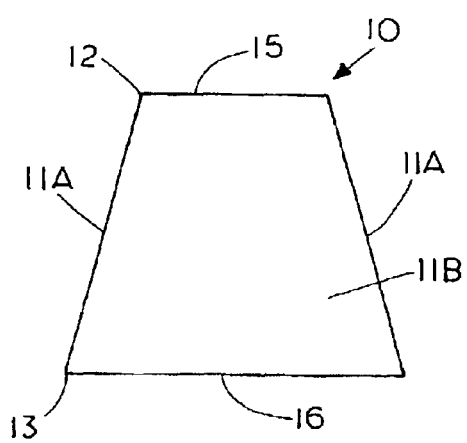
FIG. 5 shows a side view of the four-sided shock isolator of FIG. 1.

FIG. 4 is an end view of four-sided shock isolator 10 showing the side surface 14 of the first elongated support surface 12 with respect to end surface 17 of second elongated support surface 13. FIG. 5 is a side view of shock isolator 10 showing the end surface 15 of the first elongated support surface 12 and side surface 16 of the second elongated support surface 13 of four-sided shock isolator 10.

As shown in FIGS. 4 and 5, the lateral positioning of the first elongated support surface 12 with respect to the second elongated support surface 13 results in the sidewalls 11A and end walls 11B of shock isolator 10 extending from the first support surface 12 to the second support surface 13 at an angle to thereby provide support to sidewalls 11A and end walls 11B. To illustrate the offset support an axis 42a is shown extending from surface 12 past end surface 17 with the axis spaced a distance "x" from end surface 17.

Figure 6:
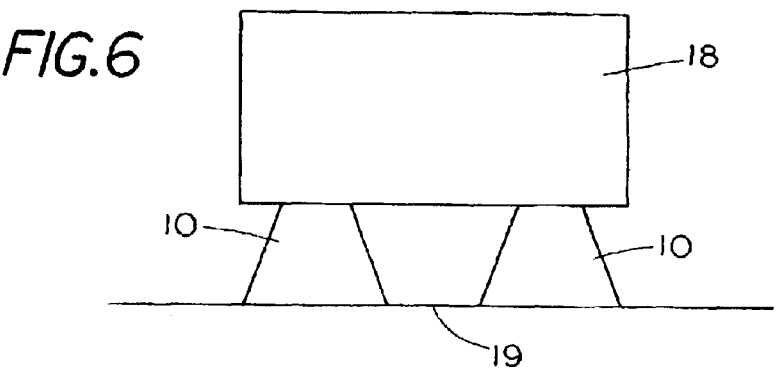
FIG. 6 shows a pair of four-sided shock isolator supporting a housing on a support surface.

FIG. 6 shows a pair of four-sided shock isolator 10 supporting the static weight of a housing 16, which may contain equipment to be protected from shock and vibration, on a support surface 19. Although two four-sided shock isolators 10 are shown supporting housing 18 while simultaneously providing the proper shock and vibration attenuation characteristics, a single four-sided shock isolator 10 or more than two four-sided shock isolator 10 can also provide support for housing 18 while at the same time providing the proper shock and vibration attenuation characteristics.

Figure 7:
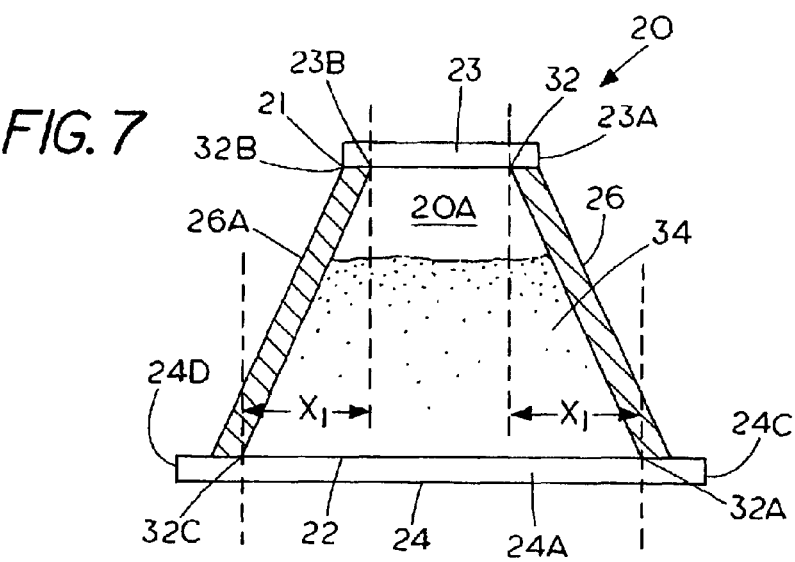
FIG. 7 is a partial cross-section view of a side view of a four-sided shock isolator having a pair of rigid plates secured thereto with damping material shown.
Figure 8:
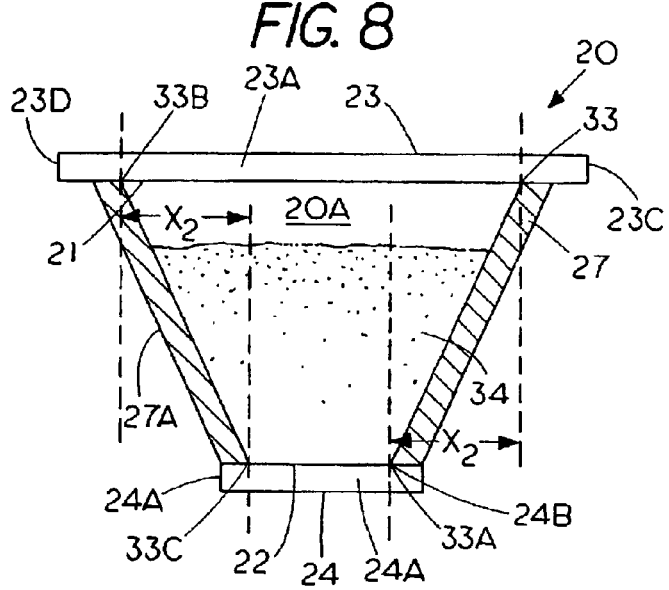
FIG. 8 is a partial cross-section view of an end view of a four-sided shock isolator having a pair of rigid plates secured thereto with damping material shown.

FIG. 7 is a side view of a four-sided shock isolator 20 and FIG. 8 is an end view of four-sided shock isolator 20 with both FIGS. 7 and 8 showing four-sided shock isolator 20 having a first rigid plate 23 secured to a first support surface 21 of shock isolator 20 for engaging a member such as a housing that is to be isolated from shock and vibration and a second rigid plate 24 secured to a second support surface 22 of shock isolator 20 for engaging a second member such as a support surface. First rigid plate 23 has parallel sides 23A and 23B and parallel ends 23C and 23D. Second rigid plate 24 has parallel sides 24A and 24B and parallel ends 24C and 24D. As shown in the embodiment of FIGS. 7 and 8, sides 23A and 23B of the first rigid plate and sides 24A and 24B of the second rigid plate 24 all have longer lengths than the lengths of the ends 23C and 23D of the first rigid plate 23 and the ends 24C and 24D of second rigid plate 24.

Figure 9:
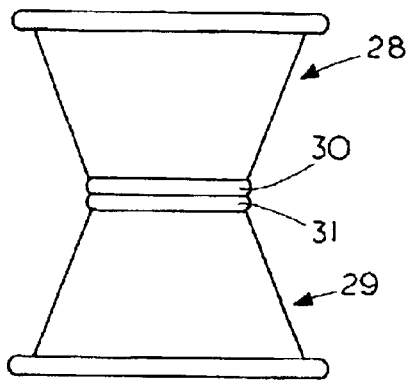
FIG. 9 is a side view showing a pair of four-sided shock isolators stacked on top of each other.

FIG. 9 shows a pair of four-sided shock isolators 28 and 29, which are similar to the shock isolator 20 of FIGS. 7 and 8, stacked in an end-to-end relationship with a rigid plate 30 of shock isolator 28 engaging a rigid plate 31 of the shock isolator 29. The stacking of four-sided shock isolators 28 and 29 provide additional axial offset compressive support while at the same time providing necessary shock and vibration attenuation characteristics. While the four-sided shock isolators are shown stacked with rigid plates, the plates 30 and 31 need not be used as the elastomer end surface of the four-sided shock isolator 28 could be secured to the elastomer end surface of four-sided shock isolator 29.

Referring back to FIGS. 7 and 8, FIGS. 7 and 8 also shows partial cross-sectional views of four-sided shock isolator 20. As shown in FIGS. 7 and 8, the rotational positioning of the support surfaces 21 and 22 with respect to each other results in the end walls 26 and 26A and sidewalls 27 and 27A of shock isolator 20 secured to the first rigid plate 23 and the second rigid plate 24 being aligned at an angle.

FIG. 7 shows the angling engagement of end wall 26 to rigid plates 23 and 24 with end wall 26 engaging the first rigid plate 23 exterior to an inner peripheral boundary 32 located proximate side 23A of first rigid plate 23 and engaging the second rigid plate 24 at position 32A. Position 32, which defines an inner peripheral boundary of rigid plate 23 running along side 23A of rigid plate 23 and position 32A, which defines inner peripheral boundary of rigid plate 24 and extending along end 24C. The lateral distance between position 32 and position 32A has a distance "$x_1$" where distance "$x_1$" is greater than the thickness of end wall 26 thereby ensuring that there is no axial compressive axis perpendicular to plates 23 and 24 for wall 26.

FIG. 7 also shows the angling engagement of end wall 26A to rigid plates 23 and 24 with end wall 26A engaging first rigid plate 23 exterior to an inner peripheral boundary 32B located proximate side 23B of rigid plate 23 and engaging second rigid plate exterior to an inner peripheral boundary 32C located proximate end 24D of rigid plate 24. Position 32B, which defines the inner peripheral boundary of rigid plate 23 extends along side 23B of rigid plate 23 and position 32C, which defines the inner peripheral boundary of rigid plate 24 extends along end 24D. The lateral distance between position 32B and position 32C has a distance "$x_1$" where distance "$X_1$" is greater than the thickness of the end wall 26A thereby ensuring that there is no axial compressive axis perpendicular to plates 23 and 24 for wall 26A.

Referring to FIG. 8, the angling engagement of sidewall 27 to rigid plates 23 and 24 with sidewall 27 engaging the first rigid plate 23 exterior to an inner peripheral boundary 33 located proximate end 23C of rigid plate 23 and engaging the second rigid plate 24 at position 33A. Position 33, which defines an inner peripheral boundary of rigid plate 23, extends along end 23C of rigid plate 23 and position 33A, which defines the inner peripheral boundary of rigid plate 24 extends along side 24B. The lateral distance between position 33 and position 33A also has a distance "$x_2$" where distance "$x_2$" is greater than the thickness of sidewall 27 thereby ensuring that there is no axial compressive axis perpendicular to plates 23 and 24 for wall 27.

FIG. 8 also shows the angling engagement of sidewall 27A to rigid plates 23 and 24 with sidewall 27A engaging the first rigid plate 23 exterior to an inner peripheral boundary 33B located proximate end 23D of rigid plate 23 and engaging the second rigid plate 24 exterior to an inner peripheral boundary 33C located proximate side 24A of rigid plate 24. Position 33B, which defines the inner peripheral boundary of rigid plate 23 extends along end 23D of rigid plate 23 and position 33C, which defines the inner peripheral boundary of rigid plate 24 extends along side 24A. The lateral distance between position 32B and position 32C also has a distance "$x_2$" where distance "$x_2$" is greater than sidewall 27A thereby ensuring that there is no axial compressive axis perpendicular to plates 23 and 24 for wall 27A.

The angling of the walls of four-sided shock isolator 20 result in the first elongated support surface 21 being laterally positioned with respect to the second elongated support surface 22 so that any point on the first elongated support surface 21 is supported by the second elongated support surface 22 and vice versa so as to permit the shock isolator 20 to simultaneously provide shock and vibration attenuation while providing axially offset support. That is the lateral offset of the support surfaces 21 and 22 will prevent the end walls 26 and 26A and sidewalls 27 and 27A of shock isolator 20 from acting in a pure axial compression mode. Instead the end walls 26 and 26A and sidewalls 27 and 27A will provide compression support through an axial offset support that allows the walls of four-sided shock isolator 20 to move circumferentially outwards in response to dynamic forces.

Although the first support surface 21 is shown in the present embodiment as being the same size as the second support surface 22, alternative embodiments may provide for a first support surface having a larger size than a second support surface or vice versa.

Figure 10:
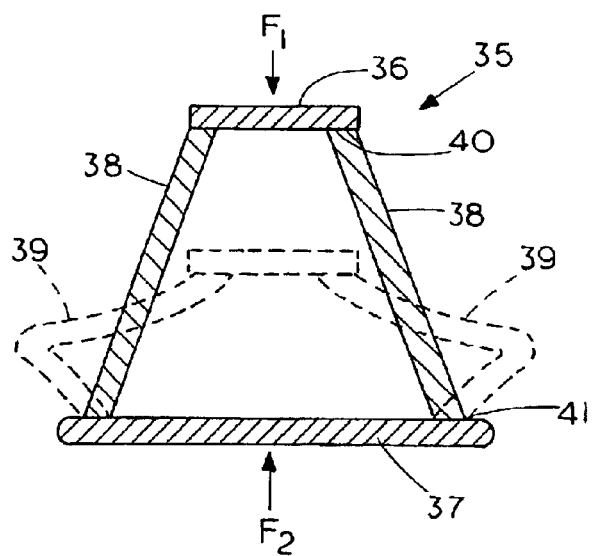
FIG. 10 shows a cross-sectional view of a four-sided shock isolator under a static and a dynamic force.

FIG. 10 shows a cross-sectional view of a four-sided shock isolator 35 similar to the shock isolator 20 of FIGS. 7 and 8. To illustrate the operation of forces, a first force $F_1$ acts on a first rigid plate 36 of shock isolator 35 and a second force $F_2$ acts on a second rigid plate 37 of shock isolator 35. Due to support by the walls of shock isolator 35 (only the end walls 38 are shown in FIG. 10), the compressive forces acting on four-sided shock isolator 35 does not result in pure axial compression of the walls but instead produces axial offset compression which results in the bulging or outward expansion of the walls as indicated by the dotted lines 39. That is, forces $F_1$ and $F_2$ cause the walls of shock isolator 35 to bulge outward instead of absorbing the force by direct axial compression of the elastomer.

The positioning of a first support surface 40 and a second support surface 41 of four-sided shock isolator 35 at a 90° angle with respect to each other results in support surfaces 40 and 41 of four-sided shock isolator 35 being laterally offset from each other to provide a shock isolator that can support a static load as well as isolate shock and vibration forces from the housing by eliminating a direct axial compression path through the shock isolator. In addition, the rotated positioning of the support surfaces 40 and 41 of four-sided shock isolator 35 will also prevent a significant bias in a single direction thus leading to homogenous shock isolation.

If desired a damping material such as a high-density resilient material 34 shown in FIGS. 7 and 8, can be placed in a cavity 20A of the shock isolator 20 to thereby alter the damping characteristics of the shock isolator. For example, a known damping material comprising particles of tungsten carbide or the like can be placed in the cavity.

Referring to FIGS. 7 and 8, the present invention also includes a method of making a shock isolator for simultaneously providing compression support and shock isolation comprising the steps of: (1) molding an elastomer material into the shape of a four-sided shock isolator 20 having sidewalls 27 longer than the width of the end walls 26 with the first elongated support surface 21 and the second elongated support surface 22 of the shock isolator 20 laterally positioned with respect to each other so that a line parallel to a central axis of shock isolator 20 and extending through first elongated support surface 21 does not extend along an elastomers sidewall through second elongated support surface 22 and vice versa to thereby provide shock and vibration attenuation and axially offset support; (2) attaching first rigid mounting plate 23 to the first elongated support surface 21 and attaching second rigid mounting plate 24 to the second elongated support surface 22 of shock isolator 20. The present invention may also include the step of placing a damping material 34 into the cavity 20A of shock isolator 20.

I claim:

1. A shock isolator for simultaneously isolating shocks and supporting a static load comprising:
    an elastomer material, said elastomer material having a set of connecting walls integrally forming a four-sided shock isolator with a cavity therein, said four-sided shock isolator having a central axis; and
    a first elongated support surface located on a first end of the elastomer material and a second elongated support surface located on an opposing end of the elastomer material with said first elongated support surface and said second elongated support surface being rotationally positioned with respect to each other so that any point on said first support surface is supported by said second support surface and vice versa.

2. The shock isolator of claim 1 wherein the first support surface is identical to the second support surface in shape.

3. The shock isolator of claim 1 wherein the first support surface and the second support surface are of different sizes and shapes.

4. The shock isolator of claim 1 wherein said cavity includes a damping material.

5. The shock isolator of claim 1 wherein the first elongated support surface and the second elongated support surface are substantially parallel to each other so that a compressive force acting on said first elongated support surface causes the side to bulge partially outwardly and partially inwardly in response to compressive forces on either of said first elongated support surface or said second elongated support surface.

6. The shock isolator of claim 1 wherein the rotational positioning of the first support surface with respect to the second support surface is 90° about a longitudinal axis.

7. A shock isolator for simultaneously isolating shocks and supporting a static load in an axial offset compression mode comprising:
- a four-sided elastomer, said elastomer having a chamber therein;
- a central axis, said elastomer having a first end and a second end;
- a first elongated support surface located at the first end of said four-sided elastomers; and
- a second elongated support surface located at the second end of said four-sided elastomers, said first elongated support surface laterally positioned with respect to said second elongated support surface so that any point on said first support surface is supported by said second support surface and vice versa to thereby simultaneously provide shock and vibration attenuation while providing axially offset support without allowing a direct compressive path through a longitudinal axis of the material.

8. The shock isolator of claim 7 wherein the first support surface is rotationally position at an angle 90° with respect to the second support surface.

9. The shock isolator of claim 7 including a first rigid mounting plate secured to the first elongated support surface of said elastomer and a second rigid mounting plate secured to the second elongated support surface of said elastomer.

10. The shock isolator of claim 7 wherein the first elongated support surface is the same size as the second elongated support surface.

11. The shock isolator of claim 7 wherein the size of the first elongated support surface is different from the size of the second elongated support surface.

12. The shock isolator of claim 7 wherein the four-sided elastomer consists of four sides none of which are perpendicular to said first elongated support surface.

13. The shock isolator of claim 7 wherein the first elongated support surface and the second elongated support surface are substantially parallel to each other so that a compressive force acting on either the first elongated support surface or the second support surface causes the four-sided elastomer to bulge outwardly and inwardly in response thereto.

14. The shock isolator of claim 7 including a further four-sided elastomer, said further four-sided elastomer stacked in an end-to-end relationship with said four-sided elastomer.

15. The shock isolator of claim 7 wherein the first elongated support surface and the second elongated support surface comprises a first rectangular support surface and a second rectangular support surface.

* * * * *